(No Model.)
H. J. CORDESMAN, Jr., & J. R. THOMAS.
PLANING MACHINE.
No. 275,597. Patented Apr. 10, 1883.
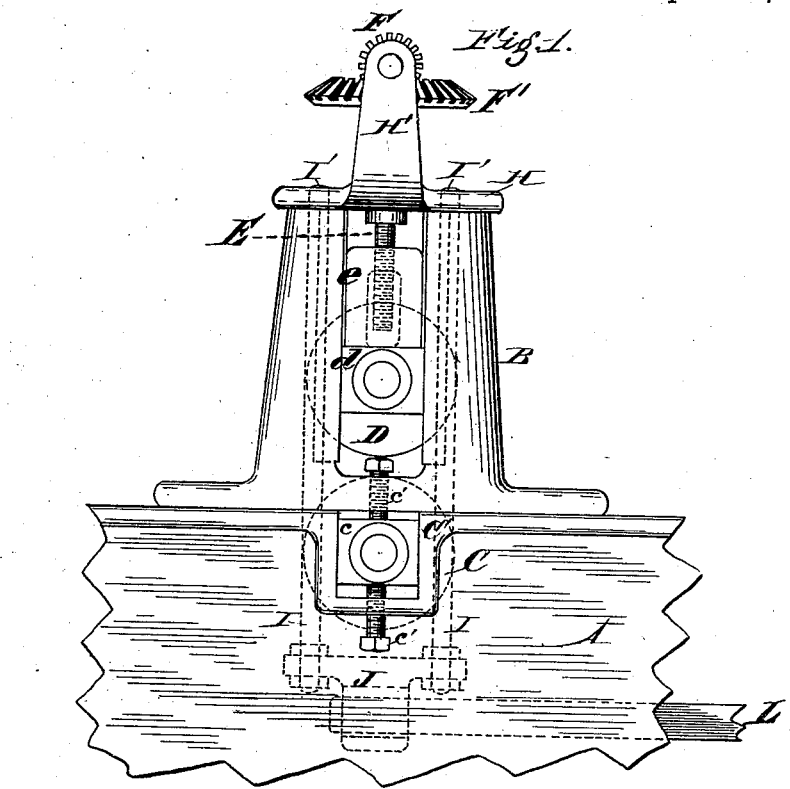
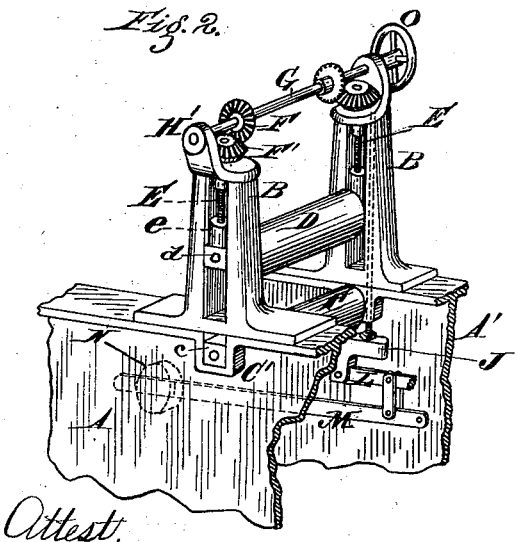
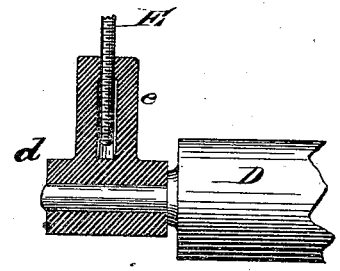

UNITED STATES PATENT OFFICE.

HENRY J. CORDESMAN, JR., AND JOHN R. THOMAS, OF CINCINNATI, OHIO.

PLANING-MACHINE.

SPECIFICATION forming part of Letters Patent No. 275,597, dated April 10, 1883.

Application filed November 14, 1882. (No model.)

*To all whom it may concern:*

Be it known that we, HENRY J. CORDESMAN, Jr., and JOHN R. THOMAS, both citizens of the United States, and residents of Cincinnati, in the county of Hamilton and State of Ohio, have invented certain new and useful Improvements in Planing-Machines, of which the following is a specification.

Our invention relates to an improved method of constructing and combining the feeding-rollers in planing-machines, and also to an improvement in regulating the set of the rolls and applying pressure thereto, all of which will be fully explained in the description of the accompanying drawings, in which—

Figure 1 is a side elevation of our improvement applied to the frame of a planing-machine. Fig. 2 is a perspective view of the same; and Fig. 3 is a central sectional elevation of one of the upper-roller journals.

A A' represent the frame of an ordinary planing-machine; B B, open columns, which form journal-guides, and which are securely attached to the frame A A'.

C represents the fixed feed-rollers; c, journals for the shaft of roller C, which is adjustably set in the frame C'.

c' c' represent set-screws for adjusting the journals c in any desired fixed position.

D represents the upper and movable pressure-roller, which is hung in L-shaped journal-boxes d, the horizontal portion of which boxes slide vertically in the open space or ways provided in columns B. The stem or vertical portion e of the boxes d have screw-threads tapped therein, as shown in Fig. 3.

E represents screw-rods tapping into the stems e, which must be a sufficient length to afford the necessary amount of vertical adjustment of the roller D, which is effected by the turning of the screw-rods E.

F' F' represents bevel-wheels keyed to screw-rods E, and F similar gears, keyed upon the horizontal shaft G, journaled above the bevel-gears F', as shown in Fig. 2.

H H represent bed-plates, which rest loosely on the top of columns B.

H' represents ears or studs on which shaft G journals.

Screw-rods E likewise are journaled vertically through said plates H, and the gears, being keyed through screw-rods E, suspend the pressure-rollers D adjustably on the plates H.

In order to allow yielding motion to roller D and apply a weight thereto to control the feeding pressure, columns B are pierced vertically from top to bottom with two holes, through which pass guide-rods I, as shown in dotted lines, Fig. 1. I' represents the head of these rods I, which rest on the top of plates H.

J represents cross-heads, to which the guide-rods I are attached. The space between the lower roller, C, and the top of cross-head J is made sufficient to allow the yielding motion caused by the rising of roller D.

M represents scale-beams, attached by pivoted levers to cross-head J, as shown in Fig. 2. The drawings are shown as designed to employ two weighted levers, M, or scale-beams, one under each cross-head J; but it is manifest that the two cross-heads J may be connected together by a cross-beam, and the one weigted beam, M, attached thereto.

N represents a weight, adjustably attached to beam M, so as to vary the amount of pressure-weight applied to the feed-roll D.

O represents a hand-wheel, keyed upon shaft G, which is turned to adjust the roller D to any desired distance from the fixed roll C, and it is usual to adjust the rolls nearer together than the thickness of the clear stuff planed, so as to apply suitable feed-roll pressure. When the lumber passes between the rolls C and D, the roll D, with its sliding journals d, rises, and with it plates H and their guide-rods I and cross-head J, to which cross-heads are attached, the weighted lever exerting downward pressure through these connections to the feed-roller D, and holding it under sufficient feeding pressure to do the required work.

The plan here shown of constructing and adjusting the roller D, so as to hold it under pressure, we find to be both better and cheaper than the means hitherto employed.

We claim—

1. In a planing-machine, the combination, with the open columns B, pressure-roller D, screw-rods E, and adjusting-gears F, to which the rods are keyed to revolve therewith, of the journal-boxes composed of the horizontal portion d, in which the journals of the pressure-roller revolve, and the vertical limb e, having screw-threads tapped into them, in which the lower ends of the rods E screw, substantially as described.

2. The combination of open columns B, pressure-roller D, journal-boxes having vertical limbs e, having screw-threads tapped therein, screw-rods E, along which the boxes are adjustable, plates H, located on the upper ends of the columns and carrying the gears F, to which the screw-rods are keyed, said plates being connected with rods I, and serving as bearings for the screw-rods, cross-head J, and weighted lever M, whereby the plates carrying the gears F and screw-rods E can rise vertically, substantially as described.

3. The combination of the open columns B, plates H on the upper ends thereof, carrying gears F and screw-rods E, which are keyed to the said gears, journal-boxes adjustable along said rods, the rods I, connected with the plates, cross-head J, and weighted lever N, whereby the top plates carrying the gears F and screw-rods E can rise and fall, substantially as described.

In testiomony whereof we have hereunto set our hands and seals in the presence of two subscribing witnesses.

HENRY J. CORDESMAN, Jr. [L. S.]
  JOHN R. THOMAS. [L. S.]

Witnesses:
  JNO. E. JONES,
  ADOLPH GLUCHOWSKY.